United States Patent Office 3,734,944
Patented May 22, 1973

3,734,944
GLYCYRRHETINIC ACID ESTERS
John Cameron Turner, Kent, England, assignor to Biorex
Laboratories Limited, London, England
No Drawing. Filed May 15, 1970, Ser. No. 37,924
Int. Cl. C07c 69/36, 69/74
U.S. Cl. 260—468.5
16 Claims

ABSTRACT OF THE DISCLOSURE

New derivatives of glycyrrhetinic acid are obtained by the esterification of glycyrrhetinic acid with unsaturated alcohols. The new compounds have valuable anti-inflammatory properties.

BACKGROUND OF THE INVENTION

It is known that glycyrrhetinic acid and many of its derivatives exhibit valuable therapeutic properties and, in particular, possess an anti-inflammatory activity. However, there is an obvious need to improve and/or modify the utility of glycyrrhetinic acid derivatives, for example, by potentiating existent activity or by modifying and altering the activity or by reducing undesirable properties such as toxicity. One of the best ways to effect the activity of a pharmaceutically-active compound is to modify the molecule.

SUMMARY OF THE INVENTION

The new glycyrrhetinic acid esters according to the present invention are compounds of the general formula:

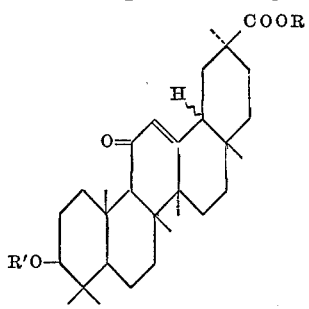

wherein R is an unsaturated, straight or branched chain aliphatic radical containing at least one double bond and/or at least one triple bond and which can contain an unsubstituted or substituted phenyl radical or R is a phenyl radical substituted by an unsaturated, straight or branched chain aliphatic radical containing at least one double bond and/or at least one triple bond, said phenyl radical optionally carrying one or more further substituents, and R' is a hydrogen atom or an acyl radical, with the proviso that when R' is a hydrogen atom, R is other than an alkenyl radical containing more than 10 carbon atoms.

DETAILED DESCRIPTION OF THE INVENTION

The unsaturated aliphatic radicals R preferably contain up to 20 carbon atoms and can be in the cis or trans configuration.

The acyl radical R' preferably contains up to 6 carbon atoms and is most preferably an acetyl radical.

As examples of substituents which can be present in the phenyl radicals, there may be mentioned alkyl radicals containing up to 6 carbon atoms, such as methyl, ethyl, isopropyl and n-hexyl radicals, alkenyl and alkynyl radicals containing up to 6 carbon atoms, such as allyl and vinyl radicals, alkoxy radicals containing up to 6 carbon atoms, such as methoxy, ethoxy and isopropoxy radicals, and halogen atoms, such as chlorine or bromine atoms.

The new compounds according to the present invention can be prepared by reacting a 3-acyl-glycyrrhetinic acid chloride with a compound of the general formula R.OH, in which R has the same meaning as above, in the presence of pyridine under anhydrous conditions and at an elevated temperature, preferably under reflux. Thereafter, the 3-acyl radical can, if desired, be removed by hydrolysis, for example, by using an ethanolic solution of sodium hydroxide.

The following example is given for the purpose of illustrating the present invention:

Example 20 g. 3-O-acetyl 18β-glycyrrhetinic acid chloride, 20 ml. geraniol and 100 ml. pyridine were mixed and refluxed for 3 hours. The reaction mixture was allowed to cool and then poured into a mixture of ice water and excess hydrochloric acid. The oily mass which formed readily solidified on standing and the solid material was filtered off, washed with water and methanol and dried. The dried product was recrystallised from methanol/dichloromethane to give pure geranyl 3-O-acetyl-glycyrrhetate in the form of white platelets with a melting point of 142–143° C.; $[\alpha]_D^{20} = +132°$ (c.=1% in chloroform). The yield obtained was 72% of theory.

The following compounds were prepared in an analogous manner:

TABLE

| R | R' | Yield, percent | M.P., °C. | $[\alpha]_D^{20}$ (deg.) |
|---|---|---|---|---|
| Allyl | Acetyl | 75 | 219–220 | +137.1 |
| Do | Hydrogen | | 210–211 | +153.2 |
| Crotyl | Acetyl | 80 | 203–204 | +139.5 |
| Do | Hydrogen | | 186–187 | +152.5 |
| Propargyl | Acetyl | 65 | 227–229 | +144.3 |
| 10-undecenyl | do | 75 | 123–124 | +116.4 |
| Eugenyl | do | 70 | 256–257 | +174 |
| Cinnamyl | do | 83 | 189–190 | +154.2 |
| Farnesyl | do | 60 | Wax-like | +99 |
| 3-methyl-pent-1-ynyl | do | 40 | 254–255 | +122.8 |
| 4-pentenyl | do | 70 | 181–182 | +129.6 |
| Citronellyl | do | 74 | 142–143 | +118.7 |
| Oleyl | do | | 103–105 | +96.8 |

The present invention also includes within its scope pharmaceutical compositions containing the new glycyrrhetinic acid esters. These pharmaceutical compositions can be administered orally or parenterally in admixture with a solid or liquid pharmaceutical carrier.

Solid compositions for oral administration include compressed tablets, pills, dispersible powders and granules. In such solid compositions, one of the new esters is admixed with at least one inert diluent, such as calcium carbonate, starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents, and sweetening and flavouring agents.

The compositions according to the present invention, for oral administration, include capsules of absorbable material, such as gelatine, containing one of the new derivatives, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active material in the compositions of the present invention may be varied, it being necessary that it should constitute a proportion such that a suitable dosage for the desired therapeutic effect shall be obtained. In general, the preparations of the present invention should be administered orally or parenterally to humans to give 10 to 1000 mg., preferably 50–500 mg. of active substance per day.

The following examples illustrate pharmaceutical compositions according to the present invention:

Example 2

250 mg. tablets are prepared containing:

| | Mg. |
|---|---|
| Geranyl 3-O-acetyl glycyrrhetate | 50 |
| Starch | 100 |
| Lactose | 95 |
| Magnesium stearate | 5 |

Example 3

400 mg. tablets are prepared containing:

| | Mg. |
|---|---|
| Citronellyl 3-O-acetyl glycyrrhetate | 100 |
| Starch | 130 |
| Lactose | 160 |
| Magnesium stearate | 10 |

The compositions according to Examples 2 and 3 are intended for oral administration to humans for the treatment of ulcerative conditions of the gastric mucosa.

I claim:
1. An ester of the general formula:

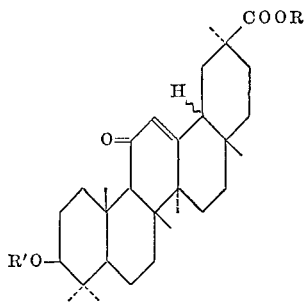

wherein R is selected from the group consisting of allyl, crotyl, propargyl, 10-undecenyl, eugenyl, cinnamyl, farnesyl, feranyl, 3-methyl-pent-1-ynyl, 4-pentenyl, and citronellyl, and R' is an alkanoyl radical containing up to 6 carbon atoms.

2. An ester according to claim 1 wherein R' is acetyl.
3. An ester according to claim 2, said ester being geranyl 3-O-acetyl-glycyrrhetate.
4. An ester according to claim 2, said ester being allyl 3-O-acetyl glycyrrhetate.
5. An ester according to claim 2, said ester being crotyl 3-O-acetyl-glycyrrhetate.
6. An ester according to claim 2, said ester being propargyl 3-O-acetyl-glycyrrhetate.
7. An ester according to claim 2, said ester being 10-undecenyl 3-O-acetyl-glycyrrhetate.
8. An ester according to claim 2, said ester being eugenyl 3-O-acetyl-glycyrrhetate.
9. An ester according to claim 2, said ester being cinnamyl 3-O-acetyl-glycyrrhetate.
10. An ester according to claim 2, said ester being farnesyl 3-O-acetyl-glycyrrhetate.
11. An ester according to claim 2, said ester being 3-methyl-pent-1-ynyl 3-O-acetyl-glycyrrhetate.
12. An ester according to claim 2, said ester being 4-pentenyl 3-O-acetyl-glycyrrhetate.
13. An ester according to claim 2, said ester being citronellyl 3-O-acetyl-glycyrrhetate.
14. An ester of the general formula:

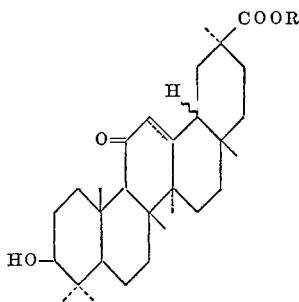

wherein R is an unsaturated straight or branched chain aliphatic hydrocarbon radical containing 3–20 carbon atoms and containing at least one double bond and/or triple bond and which can contain a phenyl radical or R is a phenyl radical substituted by an alkenyl or alkynyl radical containing up to 6 carbon atoms and which may be further substituted by an alkoxy radical containing up to 6 carbon atoms with the proviso that R must be other than an alkenyl radical containing more than 10 carbon atoms.

15. An ester according to claim 14, said ester being allyl glycyrrhetate.
16. An ester according to claim 2, said ester being crotyl glycyrrhetate.

References Cited

UNITED STATES PATENTS 3,405,152  10/1968  Veda _____ 260—410

FOREIGN PATENTS 1,119,507  7/1968  Great Britain _____ 260—468.5

LORRAINE A. WEINBERGER, Primary Examiner

R. GERSTL, Assistant Examiner

U.S. Cl. X.R.

260—488 B; 424—305